June 17, 1969          A. D. ATHERTON          3,451,021
SELF-SEALING BOBBIN FOR ENCAPSULATED SOLENOID COILS
Filed Sept. 13, 1966
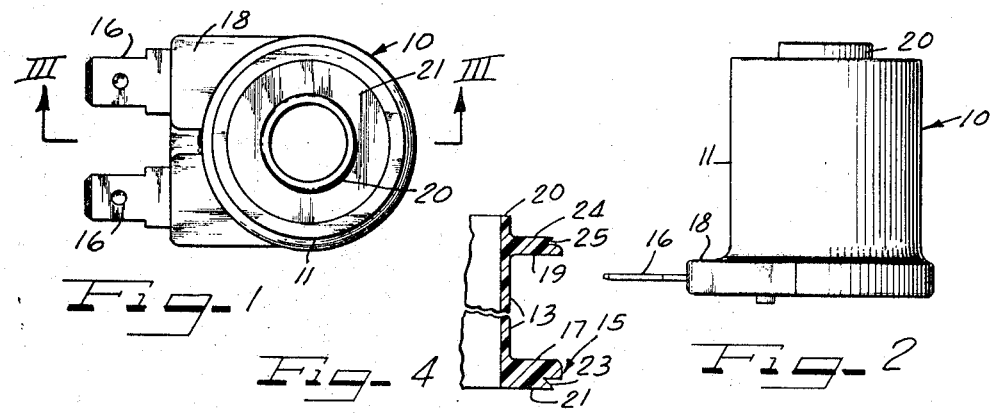
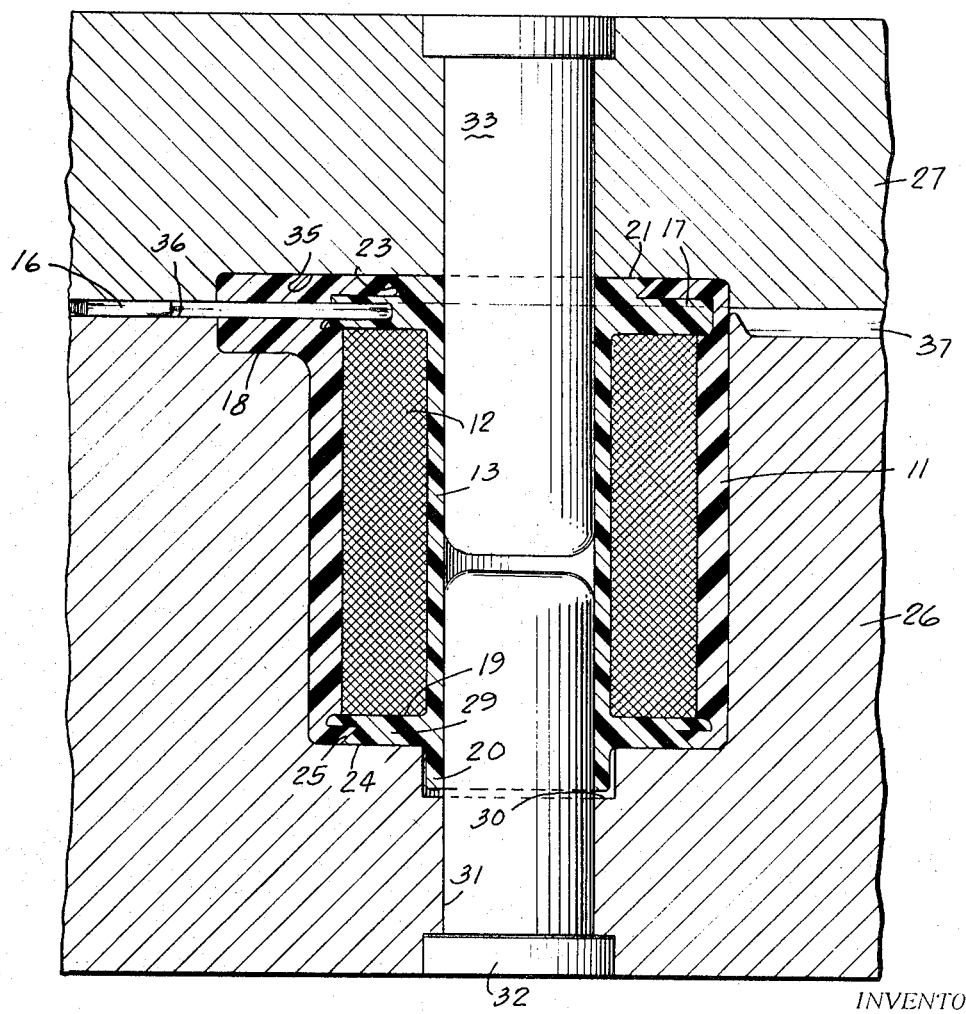
INVENTOR.
ARDEN D. ATHERTON
BY    ATTORNEYS

United States Patent Office 3,451,021
Patented June 17, 1969

3,451,021
SELF-SEALING BOBBIN FOR ENCAPSULATED SOLENOID COILS
Arden Daniel Atherton, Oak Park, Ill., assignor to The Dole Valve Company, Morton Grove, Ill., a corporation of Illinois
Filed Sept. 13, 1966, Ser. No. 579,033
Int. Cl. H01f 7/08, 5/02, 3/00
U.S. Cl. 335—260                                    6 Claims

ABSTRACT OF THE DISCLOSURE

Encapsulated solenoid coil having a non-magnetic hollow core made from a plastic material and having flanges at opposite ends of the core. A coil is wound on the core between the flanges and insulating terminals connected to the coil and molded in the flanges are electrically connected with the core. The flanges have reduced diameter bosses extending axially outwardly of opposite ends thereof, having undercut lip portions extending inwardly of the outer margins of the bosses. A plastic encapsulating material is molded to the flanges and bosses and moves the undercut lip portions into sealing engagement with the ends of the mold and seals the encapsulating material from passing along the outer faces of the bosses.

Background of the invention

Encapsulated solenoid coils have come into generally common usage particularly where the solenoil coil is to operate in a moist atmosphere and it is necessary to seal the solenoid coil from the deleterious effects of moisture in the atmosphere.

In making encapsulated solenoid coils, an electric coil is usually wound on a core or bobbin and then placed in the cavity of a mold. The encapsulating material is then injected into the mold cavity to completely encapsulate the coil and the flanges of the bobbin, to provide a one-piece coil having insulated electrical terminals leading therefrom, completely protected from the deleterious effects of moisture.

In encapsulating such coils with plastic insulating material, it is of advantage to shut off the encapsulating cavity of the mold at its opposite ends to terminate the flow of encapsulating material inwardly of the flanges of the bobbin. In shutting off the encapsulating cavity, however, it has been difficult to seal the encapsulating material to the flanges of the bobbin with the result that an improper seal is often attained and many times the insulating material flows inwardly along the flanges of the bobbin, making it necessary to clean this material from the flanges as well as any material that may lodge into the hollow interior of the core of the bobbin.

Summary and objects of the invention

An object of the present invention, therefore, is to remedy the foregoing deficiencies in encapsulated solenoid coils by so constructing the core or bobbin of the coil as to seal the encapsulating material to the flanges of the bobbin, and thereby shut off the encapsulating cavities in the mold.

Another object of the invention is to improve upon the encapsulated solenoid coils heretofore in use by providing undercut lips cooperating with the outer sides of the flanges of the core, having sealing engagement with the encapsulating material, and forced outwardly by the encapsulating material, to shut off the encapsulating cavity at opposite ends of the mold.

A further object of the invention is to provide an improved encapsulated solenoid construction in which the core for the solenoid coil has undercut self-sealing engagement with opposite walls of the mold cavity, to terminate the flow of plastic encapsulating material along said lips and form a positive seal between the encapsulating material and core.

Still another object of the invention is to provide an improved form of core for the electrical coil of a solenoid, particularly adapted for encapsulating solenoid coils, and so constructed and arranged as to form a self-sealing lip shutting off the cavity of the encapsulating mold at opposite ends of the core, and terminating the flow of encapsulating material along the end of the core to effect a positive seal at the ends of the core.

These and other objects of the invention will appear from time to time as the following specification proceeds and with reference to the accompanying drawing wherein:

FIGURE 1 is a plan view of an encapsulated solenoid coil constructed in accordance with the principles of the present invention;

FIGURE 2 is a view in side elevation of the encapsulated solenoid coil shown in FIGURE 1;

FIGURE 3 is a vertical sectional view of the coil, taken substantially along line 3—3 of FIGURE 1 and showing the coil in its mold cavity, with the mold shown in section; and FIGURE 4 is a fragmentary sectional view taken through the core of the solenoid.

In the embodiment of the invention illustrated in the drawings, I have shown in FIGURES 1 and 2, an encapsulated solenoid coil 10 encapsulated in a plastic insulating material 11, which may be a form of a nylon plastic material or any other suitable material providing a moisture tight casing for an electromagnetic coil 12.

The electromagnetic coil 12 is wound about a hollow core 13 of a spool or bobbin 15, preferably molded from a plastic material, such as a nylon thermoplastic material. The coil 12 is connected at its ends with terminals 16, 16 recessed in a bottom flange 17 of the spool, and bonded thereto. The terminals 16 are encapsulated at their inner ends in a base portion 18 of the coil, formed by molding of the encapsulating material 11 about said terminals, and extend outwardly of the base portion for connection with a current conducting circuit, in a conventional manner. The upper portion of the core 13 extends axially beyond a top flange 19 of the core and cooperates with the hollow interior portion of the core 13 to define a guide sleeve 20 for an armature (not shown).

The bottom flange 17 has an annular boss portion 21 extending axially outwardly therefrom and having a peripheral portion receding angularly inwardly from the outer face of the boss 21 to the flange 17 and forming an undercut sealing lip 23, defining the peripheral portion of the boss 21. The angle of the receding portion forming the undercut lip 23 may be of the order of 45 degrees or less, and should not be much over 45 degrees in order to provide an efficient seal between said lip and the mold cavity, during the operation of encapsulating the coil with plastic insulating material.

In a like manner the top flange 19 has an annular boss portion 24 formed integrally therewith and extending axially outwardly therefrom and connected with the flange 19 by a receding lip 25 inclined inwardly of said boss toward the flange 19 and the center of the core 13 at the angle of inclination of the peripheral face of the lip 23.

In FIGURE 3 I have shown a lower part 26 and an upper part 27 of a mold, restricting the encapsulating material to encapsulate the coil 12 with plastic encapsulating insulating material 11. The lower part 26 of the mold as a generally cylindrical cavity therein having a bottom wall 29 on which rests the outer face of the boss portion 24 of the flange 19. The bottom wall 29 is generally annular in form and terminates into a generally cylindrical recess 30 for the guide sleeve 20. The cylindrical recess 30 in turn terminates into a bore 31 for a locating pin 32 extending through the center of the hollow core 13 and locating the bobbin 15 and coil 12 in the mold, prior to and during the encapsulating operation. The locating pin 32 faces at its inner end a locating pin 33 removably mounted in the top half 27 of the mold and extending within the hollow interior portion of the core 13 from the top thereof.

The upper half 27 of the mold has a downwardly opening cavity 35 formed therein, defining the base of the solenoid coil and abutting the lower half 26 of the mold and determining the parting line of the encapsulating material. The top and bottom halves 26 and 27 of the mold are also recessed to receive the terminals 16 as indicated by reference character 36, and are widened to form the widened base 18 of the coil, extending outwardly along the terminals 16 for a short portion of the length thereof, and insulating said terminals from each other and preventing the seepage of moisture into the coil along said terminals.

The mold halves 26 and 27 are so formed as to accommodate the encapsulating of a number of coils at the same time and have runners 37, in communication with a pouring gate (not shown) and the hollow interiors of the mold cavities, to supply hot plastic encapsulating material thereto, as poured into the mold through the pouring gate.

It may be seen from FIGURE 3 that as the bobbin is located in the mold cavities by the locating pins 32 and 33 and the encapsulating material enters the mold cavity, that the material will flow about the coil 12 and downwardly into the recess formed between the undercut lip 25 and the outer surface of the flange 19. This will tend to press the undercut lip 25 and outer surface of the boss 24 into sealing engagement with the bottom 29 of the mold cavity, and shut off the mold cavity from the entrance of encapsulating material along the outer surface of the boss 24.

In a similar manner, as the mold cavity is filled above the parting line and the encapsulating material flows along the undercut lip 23, the encapsulating material will flex the undercut lip 23 upwardly into engagement with the facing surface of the mold cavity 35, and form a positive seal about the periphery of said lip and thereby block the flow or leakage of encapsulating material along the outer surface of the boss 21.

The lip structure shown and described thus enables the coil 12 to be encapsulated with a waterproof plastic encapsulating insulating material in a simple manner, and assures the sealing of the top and bottom surfaces of the cavities along the bosses 21 and 24, and thereby positively prevents the leakage of sealing material along the top and bottom surfaces of the cavities to the outer surfaces of the bosses 21 and 24.

This makes it possible to provide clearance between the guide portion 20 of the core 13 and the cavity 31, to accommodate accurate locating of the spool by the locating pins 32 and 33, and also makes it unnecessary for the opposite parallel walls of the cavity 35 of the mold to tightly engage the outer faces of the bosses 21 and 24.

While I have herein shown and described one form in which the invention may be embodied, it may readily be understood that various variations and modifications in the invention may be attained without departing from the spirit and scope of the novel concepts thereof.

I claim as my invention:

1. In a solenoid coil, and in combination with a mold retaining encapsulating material to encompass the solenoid coil, and having an internal cylindrical wall extending about the coil and opposite parallel end walls at opposite ends of said cylindrical wall,
a core having axially spaced parallel flanges and having an electromagnetic coil wound thereon between said flanges,
said flanges having reduced diameter bosses extending axially outwardly therefrom,
and having outer faces engageable with said parallel end walls of said mold, when said core is in place in said mold,
the peripheral portions of said bosses being undercut to said flanges to form undercut lips moved into sealing engagement with opposite end walls of said mold by the flow of encapsulating material along said flanges and under said lips.

2. The structure of claim 1,
wherein the undercut lips have receding angular faces receding from the peripheries of said bosses to said flanges.

3. The structure of claim 2,
wherein the undercut lips are inclined at angles of the order of 45° with respect to said flanges.

4. In a solenoid coil,
a hollow non-magnetic core formed from a plastic material having flanges at opposite ends thereof and having an electrical coil wound thereon between said flanges and also having insulating terminals molded in one of said flanges and electrically connected to said coil and extending from said flanges,
encapsulating material molded to encapsulate said coil and extend along said flanges,
said flanges having undercut lip portions extending inwardly of the outer margins thereof and forming sealing lips, moved into sealing engagement with the mold by the encapsulating material, upon molding the encapsulating material about the coil, and sealing the encapsulating material from passing along the outer surfaces of the flanges during the operation of encapsulating the coil with insulating material.

5. The structure of claim 4,
wherein the undercut lips are at angles extending inwardly of said flanges of the order of 45° with respect to the outer surfaces of said flanges.

6. The structure of claim 4,
wherein the flanges have reduced diameter bosses extending axially outwardly therefrom, and
wherein the undercut lip portions are formed in the bosses of said flanges and have receding angular peripheral faces spaced inwardly of the outer margins of said flanges and sealing the encapsulating material to said flanges and bosses and preventing the encapsulating material from passing along the outer faces of said bosses during the operation of encapsulating said coil.

References Cited

UNITED STATES PATENTS

| | | | |
|---|---|---|---|
| 2,449,438 | 9/1948 | Wisegarver | 335—260 XR |
| 3,043,994 | 7/1962 | Anderson et al. | 335—299 |
| 3,076,919 | 2/1963 | Hamilton et al. | 335—299 |

BERNARD A. GILHEANY, *Primary Examiner.*

H. BROOME, *Assistant Examiner.*

U.S. Cl. X.R.

335—299